United States Patent
Wang et al.

(10) Patent No.: US 8,312,554 B2
(45) Date of Patent: Nov. 13, 2012

(54) METHOD OF HIDING FILE AT DATA PROTECTING MODE FOR NON-VOLATILE MEMORY MODULE, MEMORY CONTROLLER AND PORTABLE MEMORY STORAGE APPARATUS

(75) Inventors: Chih-Ling Wang, Miaoli (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 220 days.

(21) Appl. No.: 12/882,212

(22) Filed: Sep. 15, 2010

(65) Prior Publication Data
US 2012/0030411 A1     Feb. 2, 2012

(30) Foreign Application Priority Data
Jul. 29, 2010    (TW) ................................ 99125120 A

(51) Int. Cl.
*G06F 12/00*     (2006.01)
(52) U.S. Cl. ............ 726/26; 726/34; 711/162; 711/165; 711/173; 711/103; 713/1; 714/699
(58) Field of Classification Search .................. 711/162, 711/165, 173, 103; 726/34, 26; 714/699; 713/1
See application file for complete search history.

(56) References Cited

U.S. PATENT DOCUMENTS

| | | | |
|---|---|---|---|
| 6,286,013 B1 * | 9/2001 | Reynolds et al. | 719/328 |
| 2007/0226266 A1 * | 9/2007 | Lee et al. | 707/200 |
| 2012/0089805 A1 * | 4/2012 | Liu | 711/173 |

\* cited by examiner

*Primary Examiner* — Hong Kim
(74) *Attorney, Agent, or Firm* — Jianq Chyun IP Office

(57) ABSTRACT

A data protecting method for a portable memory storage apparatus is provided. The method includes determining whether a mode signal is at a data protecting mode, and performing a file hiding procedure to change a file allocation table if the mode signal is at the data protecting mode, wherein a host system coupled to the portable memory storage device is allowed to only access a portion of logical addresses of the portable memory storage apparatus according to the changed file allocation table and files stored in the portable memory storage apparatus before the file hiding procedure are written into another portion of the logical addresses. Additionally, the method still includes performing a file showing procedure to change the file allocation table if the mode signal is not at the data protecting mode, wherein the host system may access all the logical addresses according to the changed file allocation table.

24 Claims, 16 Drawing Sheets

METHOD OF HIDING FILE AT DATA PROTECTING MODE FOR NON-VOLATILE MEMORY MODULE, MEMORY CONTROLLER AND PORTABLE MEMORY STORAGE APPARATUS

CROSS-REFERENCE TO RELATED APPLICATION

This application claims the priority benefit of Taiwan application serial no. 99125120, filed on Jul. 29, 2010. The entirety of the above-mentioned patent application is hereby incorporated by reference herein and made a part of specification.

BACKGROUND

1. Technology Field

The present invention relates to a data protecting method and particularly to a data protecting method for protecting files stored in a non-volatile memory module, and a memory controller and a portable memory storage apparatus using the same.

2. Description of Related Art

Digital cameras, cell phones, and digital music players have undergone rapid growth in recent years, so that consumer demand for storage media have also rapid increased. Rewritable non-volatile memory is one of the most adaptable memories for such battery-powered portable products due to its characteristics such as data non-volatility, low power consumption, small volume, and non-mechanical structure. A flash drive is a storage apparatus adopting NAND flash memory as storage medium. A flash drive has been broadly used for storing or delivering data due to its small volume and large capacity.

For example, a user may borrow flash drives from others to store digital files that are delivered. However, a flash drive usually is used for storing important personal data. Therefore, when a user lends others his/her flash drive, how to prevent the user's personal data stored in his/her flash drive from seeing or accessing by others is one of the important subjects.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data protecting method capable of effectively hiding files stored in a memory module according to user's demands.

The present invention is directed to a memory controller capable of effectively hiding files stored in a memory module according to user's demands.

The present invention is directed to a non-volatile memory system capable of effectively hiding files stored in a memory module according to user's demands.

According to an exemplary embodiment of the present invention, a data protecting method for a non-volatile memory module is provided, wherein the non-volatile memory module has a plurality of physical blocks. The data protecting method includes grouping the physical blocks into at least a data area, a spare area and a system area; configuring a plurality of logical addresses; and grouping the logical addresses into a plurality of logical blocks for mapping to the physical blocks of the data area, wherein the logical addresses are formatted as a partition, the partition includes a file allocation table (FAT) area, a file area and a directory area, the FAT area stores a FAT, the file area stores a first file, the directory area stores a first file description block corresponding to the first file and the FAT records a first entry value corresponding to logical addresses storing the first file. The data protecting method includes determining whether a mode signal is at a data protecting mode and performing a file hiding procedure if the mode signal is at the data protecting mode. Herein, the file hiding procedure includes generating a FAT backup according to the FAT; storing the generated FAT backup in the system area; generating a file description block backup according to the first file description block; storing the generated file description block backup in the system area; marking the first entry value as a bad cluster symbol indicating that data can not be stored; and erasing the first file description block in the partition.

According to an exemplary embodiment of the present invention, a memory controller including a memory interface, a memory management circuit and a host interface is provided. The memory interface is coupled to the memory management circuit and configured for accessing the above-mentioned memory module. The host interface is coupled to the memory management circuit and configured for coupling to a host system. The memory management circuit is configured for executing the above-mentioned data protecting method.

According to an exemplary embodiment of the present invention, a memory storage system including a mode selecting switch, a connector, the above-mentioned memory module and a memory controller coupled to the memory module is provided. Herein the memory controller is configured for executing the above-mentioned data protecting method.

According to an exemplary embodiment of the present invention, a data protecting method for a portable memory storage apparatus is provided, wherein the portable memory storage apparatus includes a non-volatile memory module having a plurality of physical blocks. The data protecting method includes grouping the physical blocks into at least a data area, a spare area and a system area; configuring a plurality of logical addresses; and grouping the logical addresses into a plurality of logical blocks for mapping to the physical blocks of the data area, wherein the logical addresses are formatted as a partition, the partition includes a file allocation table (FAT) area, a file area and a directory area, the FAT area stores a FAT, the file area stores a first file, the directory area stores a first file description block corresponding to the first file and the FAT records a first entry value corresponding to logical addresses storing the first file. The data protecting method also includes determining whether a mode signal is at a data protecting mode. The data protecting method still includes performing a file hiding procedure to change the FAT if the mode signal is at the data protecting mode, wherein a host system coupled to the portable memory storage apparatus is allowed to only access a portion of the logical addresses based on the changed FAT corresponding to the file hiding procedure and the first file is stored in another portion of the logical addresses. Additionally, the data protecting method further includes performing a file showing procedure to change the FAT if the mode signal is not at the data protecting mode, wherein the host system is allowed to access all of the logical addresses based on the changed FAT corresponding to the file showing procedure.

Based on the above, the data protecting method, the memory controller and the portable memory storage apparatus of the exemplary embodiment can hide or show files stored in the portable memory storage apparatus according to the mode signal, thereby protecting the files.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10C illustrates an example of a file allocation table area according to the exemplary embodiment of the present invention.

FIG. 12 is another diagram of the file allocation table area according to the exemplary embodiment of the present invention.

DESCRIPTION OF EMBODIMENTS

Figure 1A:
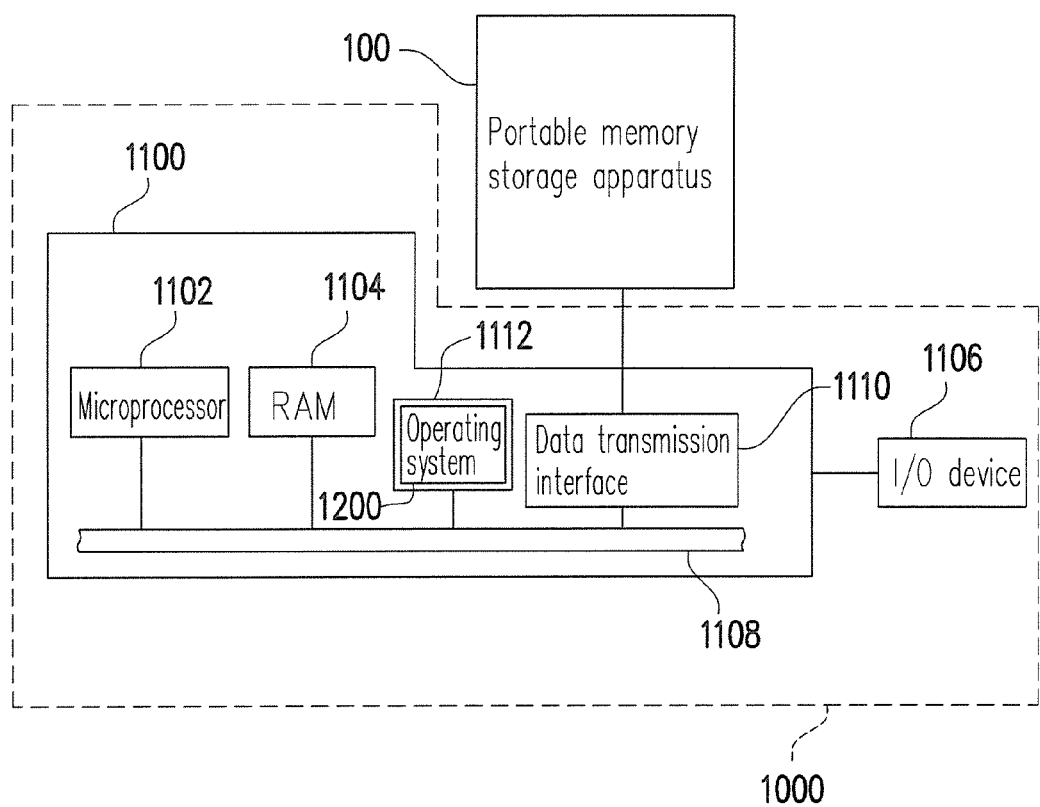
FIG. 1A is a schematic block diagram of a host system using a portable memory storage apparatus according to an exemplary embodiment of the invention.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to protect files stored in a portable memory storage apparatus, a data protecting method according to the exemplary embodiment of the present invention changes a file allocation table (FAT) according to a state of a mode selecting switch of the portable memory storage apparatus, such that a host system can not access logical addresses storing the files to be protected. To be specific, an operating system of a host system accesses files stored in a portable memory storage apparatus based on a FAT. Accordingly, the data protecting method of the exemplary embodiment will change records of the FAT to make the operating system of the host system not to obtain information about the files stored in the portable memory storage apparatus, thereby hiding the files. Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic block diagram of a host system using a portable memory storage apparatus according to an exemplary embodiment of the present invention.

Figure 1B:
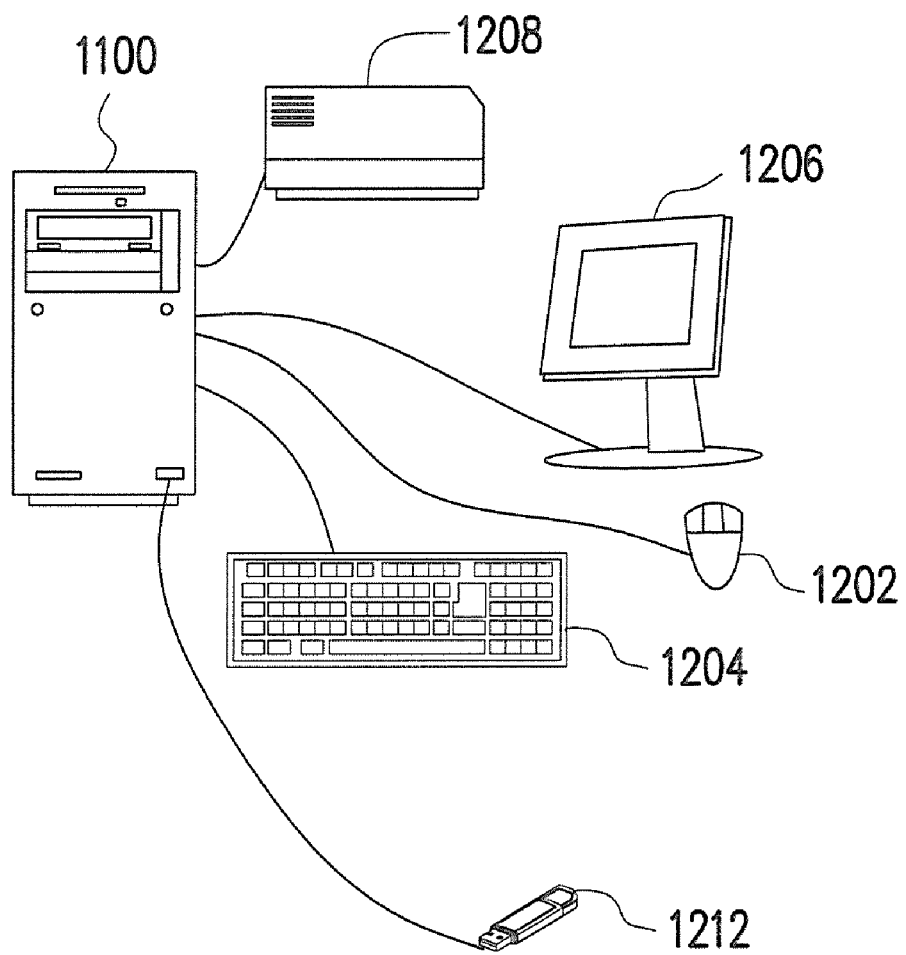
FIG. 1B is a diagram illustrating a computer, an input/output (I/O) device, and a portable memory storage apparatus according to the exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, a data transmission interface 1110 and a main storage device 1112. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the present exemplary embodiment, a portable memory storage apparatus 100 is coupled to other devices of the host system 1000 through the data transmission interface 1110. The host system 1000 may write data into or read data from the portable memory storage apparatus 100 through the CPU 1102, the RAM 1104, the I/O device 1106 and an operating system 1200 installed in the main storage device 1112. For instance, the portable memory storage apparatus 100 can be the flash disk 1212, as shown in FIG. 1B.

Figure 2A:
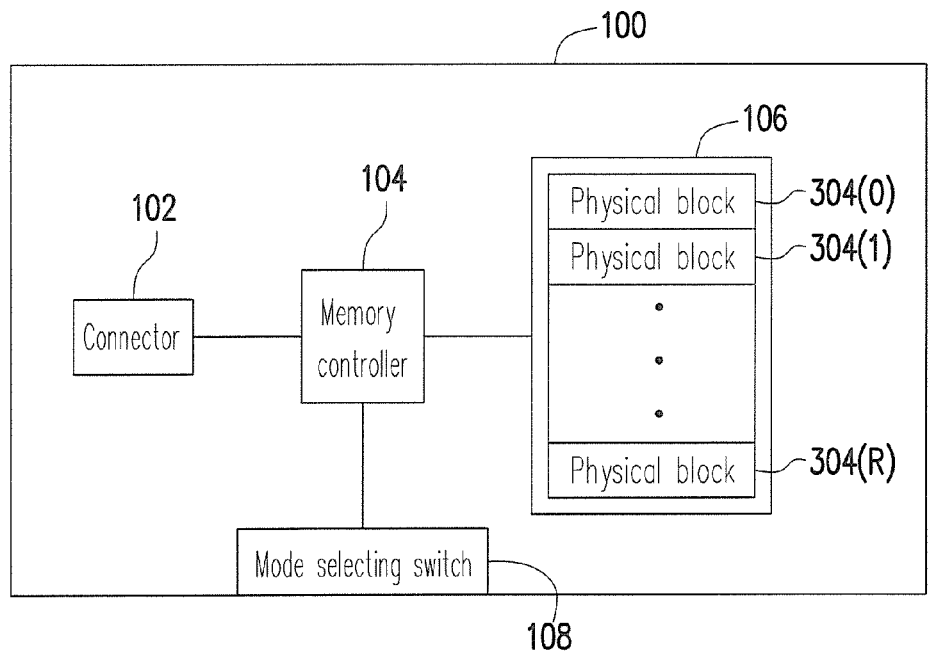
FIG. 2A is a schematic block diagram of the portable memory storage apparatus in FIG. 1A.

FIG. 2A is a schematic block diagram of the portable memory storage apparatus in FIG. 1A.

Referring to FIG. 2, the portable memory storage apparatus 100 includes a connector 102, a memory controller 104, a memory module 106 and a mode selecting switch 108.

In the present exemplary embodiment, the connector 102 is a universal serial bus (USB) connector. However, it should be noticed that the present invention is not limited thereto and the connector 102 also can be an institute-of-electrical-and-electronic-engineers (IEEE) 1394 connector, a peripheral-component Interconnect-express (PCI Express) connector, a serial advanced technology attachment (SATA) connector, a secure digital (SD) interface connector, a memory stick (MS) interface connector, a multi-media-card (MMC) interface connector, a compact flash (CF) interface connector, an integrated-device-electronics (IDE) connector or other suitable type of connectors.

The memory controller 104 executes a plurality of logic gates or control instructions implemented in a hardware form or a firmware form and performs various data operations in the memory module 106 according to commands of the host system 1000, such as data writing, reading, and erasing. In particular, the memory controller 104 is configured for executing a data protecting method and a memory management method according to the present exemplary embodiment.

The memory module 106 is coupled to the memory controller 104 and configured for storing data written by the host system 1000. The memory module 106 includes physical blocks 304(0)~304(R). Each of the physical blocks has a plurality of physical pages, wherein the physical pages belonging to the same physical block can be written individually and must be erased simultaneously.

In the present exemplary embodiment, the memory module 106 is a rewritable non-volatile memory module. For example, the memory module 106 is a multi-level cell (MLC) NAND flash memory module. However, the present invention is not limited thereto, and the memory module 106 may also be a single level cell (SLC) NAND flash memory module, other flash memory module or other memory module having the same characteristic.

The mode selecting switch 108 is coupled to the memory controller 104 and configured for outputting different mode signals according to user's demands. In particular, the memory controller 104 may identify whether the mode signal generated by the mode selecting switch 108 is at a data protecting mode (or a non-data protecting mode). That is, a user may change the state of the mode selecting switch 108 to output different mode signals, such that the memory controller 104 manages the memory module 106 with the data protecting mode or the non-data protecting mode.

For example, the mode selecting switch 108 is a contact switch, such as a push-button switch or a dual in-line package (DIP) switch, disposed on the surface of the portable memory storage apparatus 100, and may be switched to be at the data protecting mode or the non-data protecting mode by a user.

Figure 2B:
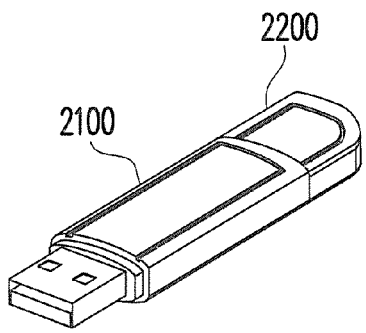
FIG. 2B and FIG. 2C are appearance diagrams of the portable memory storage apparatus according to the exemplary embodiment of the present invention.
Figure 2C:
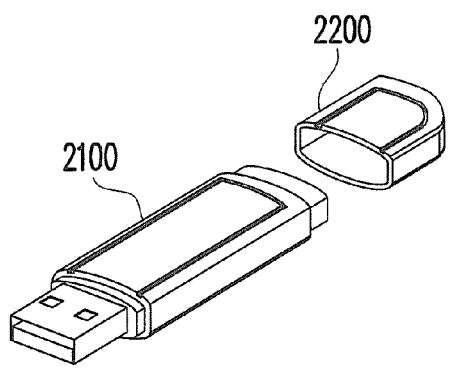

Additionally, for example, the mode selecting switch 108 may also be a magnetic induction switch, a fingerprint switch or a radio frequency identification (RFID) switch. FIG. 2B and FIG. 2C are an appearance diagrams of the portable memory storage apparatus according to the exemplary embodiment of the present invention. Referring to FIG. 2B and FIG. 2C, the portable memory storage apparatus 100 includes a body part 2100 and a hat part 2200. The hat part 2200 has magnetism. And, the mode selecting switch 108 will be turned on to be at the non-data protecting mode when the hat part 2200 is combined with the body part 2100 (as shown in FIG. 2B). Additionally, the mode selecting switch 108 will be turned off to be at the data protecting mode when the hat part 2200 is separated from the body part 2100.

Figure 3:
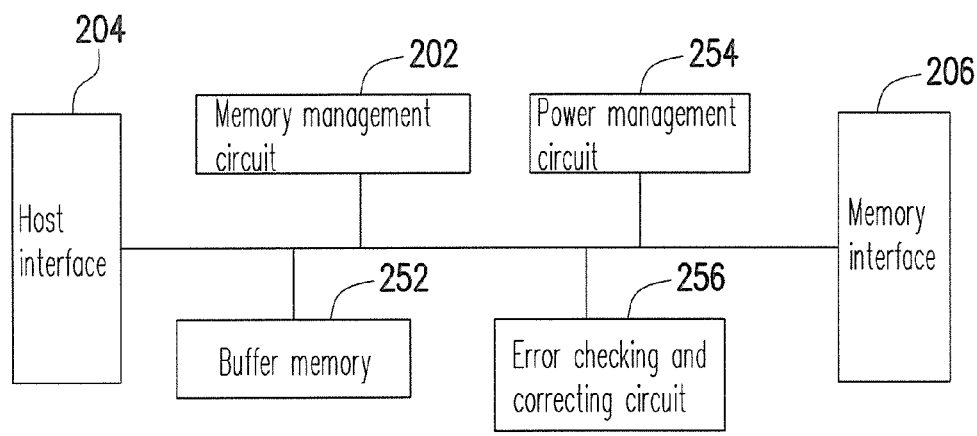
FIG. 3 is a schematic block diagram illustrating the memory controller according to the exemplary embodiment of the present invention.

FIG. 3 is a schematic block diagram of a memory controller according to the exemplary embodiment of the present invention.

Referring FIG. 3, the memory controller 104 includes a memory management circuit 202, a host interface 204 and a memory interface 206.

The memory management circuit 202 is configured for controlling the whole operation of the memory controller 104 to write, read or erase data in the memory module 106. For example, the memory management circuit 202 has a plurality of control instructions, and the control instructions are executed to manage the memory module 106 according to the data protecting method and the memory management method of the present exemplary embodiment when the portable memory storage apparatus 100 is operated. The data protecting method and the memory management method will be described with drawings in the following.

For example, in the present exemplary embodiment, the control instructions of the memory management circuit 202 are implemented in a firmware form. For example, the memory management circuit 202 has a micro-processor unit (not shown) and a read-only memory (not shown), and these control instructions are burned in the read-only memory. When the portable memory storage apparatus 100 is operated, the control instructions are executed by the micro-processor unit to accomplish the data protecting method and the memory management method according to the present exemplary embodiment.

In another exemplary embodiment of the present invention, the control instructions of the memory management circuit 202 are stored in a specific area (for example, the system area of the memory module exclusively used for storing system data) of the memory module 106 as program codes. Additionally, the memory management circuit 202 may have a micro-processor unit (not shown), a read-only memory (not shown) and a random access memory (not shown). In particular, the read-only memory has a driver code, and when the memory controller 104 is enabled, the micro-processor unit executes the driver code to load the control instructions of the memory management circuit 202, which are stored in the memory module 106, into the random access memory of the memory management circuit 202. Then, the micro-processor unit runs these control instructions to accomplish the data protecting method and the memory management method of the exemplary embodiment of the present invention. Additionally, in another exemplary embodiment, the control instructions of the memory management circuit 202 may be implemented in a hardware form.

The host interface 204 is coupled to the memory management circuit 202, and configured for receiving and identifying commands and data from the host system 1000. Namely, the commands and data from the host system 1000 are transmitted to the memory management circuit 204 through the host interface 202. In the present exemplary embodiment, the host interface 204 is a USB interface corresponding to the connector 102. However, it should be understood that the invention is not limited thereto, and the host interface 204 may be a PATA interface, a SATA interface, an IEEE 1394 interface, a PCI express interface, a SD interface, a MS interface, a MMC interface, a CF interface, an IDE interface, or other suitable data transmission interfaces.

The memory interface 206 is coupled to the memory management circuit 202 and configured for accessing the memory module 106. Namely, data to be written into the memory module 106 is converted by the memory interface 206 into a format acceptable to the memory module 106.

In another exemplary embodiment of the present invention, the memory controller 104 still includes a buffer memory 252. The buffer memory 252 is coupled to the memory management circuit 202 and configured to temporarily store data and commands from the host system 1000 or data from the memory module 106.

In another exemplary embodiment of the present invention, the memory controller 104 still includes a power management circuit 254. The power management circuit 254 is coupled to the memory management circuit 202 and configured for controlling the power of the portable memory storage apparatus 100.

In another exemplary embodiment of the present invention, the memory controller 104 still includes an error checking and correcting circuit 256. The error checking and correcting circuit 256 is coupled to the memory management circuit 202, and configured for executing an error checking and correcting procedure to ensure data accuracy. For example, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the memory module 106. Subsequently, when the memory management circuit 202 reads this data from the memory module 106, the memory management circuit 202 simultaneously reads the corresponding ECC code, and the error checking and correcting circuit 256 executes the ECC procedure for the read data based on the corresponding ECC code.

Figure 4:
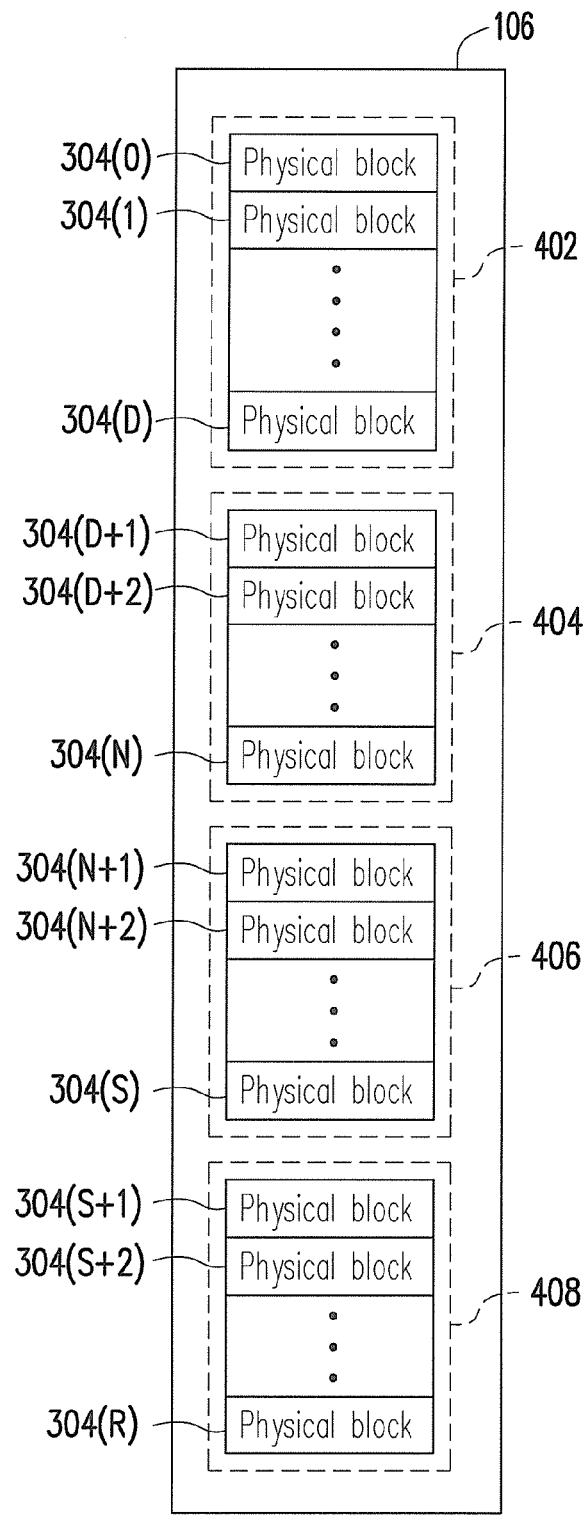
FIG. 4 and FIG. 5 are diagrams of managing the memory module according to the exemplary embodiment of the present invention.
Figure 5:
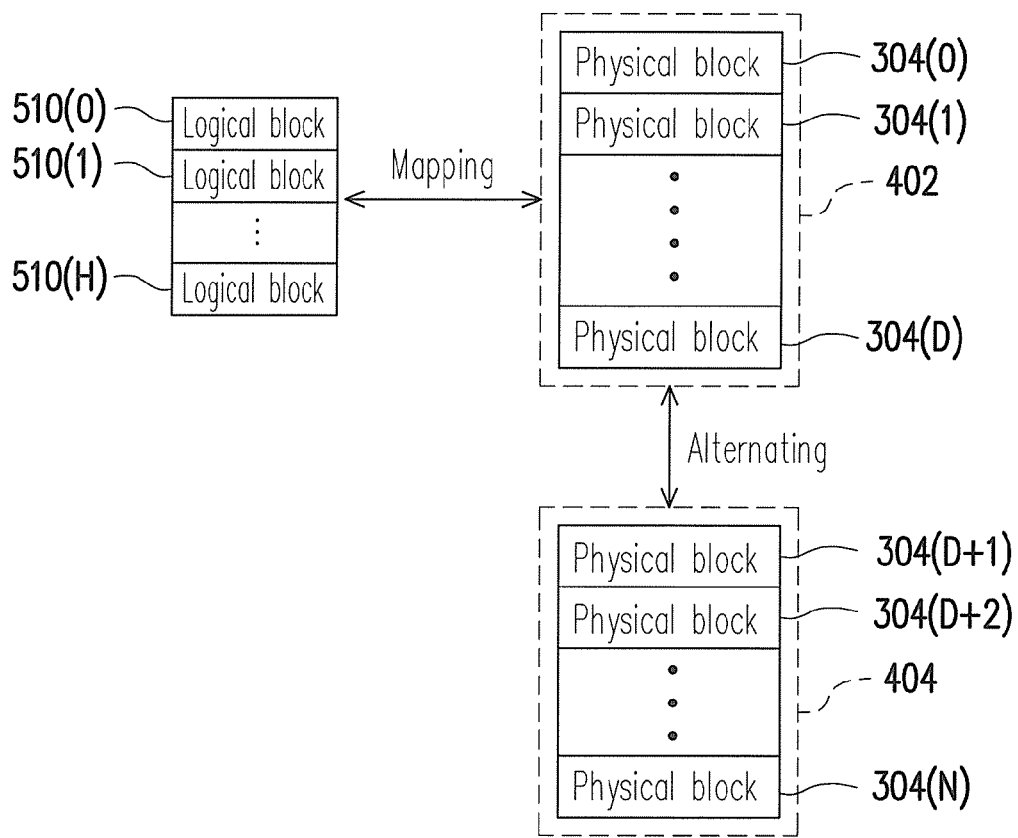

FIG. 4 and FIG. 5 are diagrams of managing the memory module according to the exemplary embodiment of the present invention.

It should be understood that the teems used herein for describing the operations (for example, "get", "select", "replace", "group", and "alternate", etc) performed on the physical blocks of the memory module 106 refer to logical operations performed on these physical blocks. Namely, the physical blocks in the memory module 106 are only logically operated and the actual positions thereof are not changed.

Referring to FIG. 4, the memory management circuit 202 logically groups the physical blocks 304(0)~304(R) of the memory module 106 into a data area 402, a spare area 404, a system area 406 and a replacement area 408.

The physical blocks of the data area 402 and the spare area 404 are used for storing data written by the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks.

The physical blocks logically belonging to the system area 406 are used for recording system data, which includes information related to the manufacturer and a model of the memory module, the number of the physical blocks, the number of the physical pages in each physical block, and so forth.

The physical blocks logically belonging to the replacement area 408 are replacement physical blocks. For example, when the memory module 106 is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block (i.e., the bad block). Thus, if there are still normal physical blocks in the replacement area 408 and a physical block is damaged, the memory management circuit 202 gets a normal physical block from the replacement area 408 for replacing the damaged physical block. If there is no more normal physical block in the replacement area 408 and a physical block is damaged, the memory management circuit 202 announces that the portable memory storage apparatus 100 is in a write-protect status and cannot be used for writing data anymore.

In particular, the numbers of physical blocks in the data area 402, the spare area 404, the system area 406 and the replacement area 408 are various based on different memory module standards. Additionally, it has to be understood that the grouping relationships of grouping the physical blocks into the data area 402, the spare area 404, the system area 406 and the replacement area 408 are dynamically changed during the operation of the portable memory storage apparatus 100. For example, when a physical block of the spare area 404 is damaged and replaced by a physical block of the replacement area 408, the physical block of the replacement area 408 is associated with the spare area 404.

Referring to FIG. 5, as described above, the physical blocks of the data area 402 and the spare area 404 are alternated to store data written by the host system 1000. In the present exemplary embodiment, the memory management circuit 202 configures logical addresses for the host system 1000 to properly access data in the physical blocks that store data with the above-mentioned alternate manner. In particular, the memory management circuit 202 groups these logical addresses into logical blocks 510(0)~510(H) and maps the logical blocks 510(0)~510(H) to the physical blocks of the data area 402. For example, when the portable memory storage apparatus 100 is formatted by the operating system 1200 with a file system (e.g., FAT 32), the logical blocks 510(0)~510(H) map to the physical blocks 304(0)~304(D) of the data area 402, respectively. That is, one logical block maps to one physical block in the data area 402. Herein, the memory management circuit 202 establishes a logical block-physical block mapping table for recoding mapping relationships between the logical blocks and the physical blocks.

Figure 6:
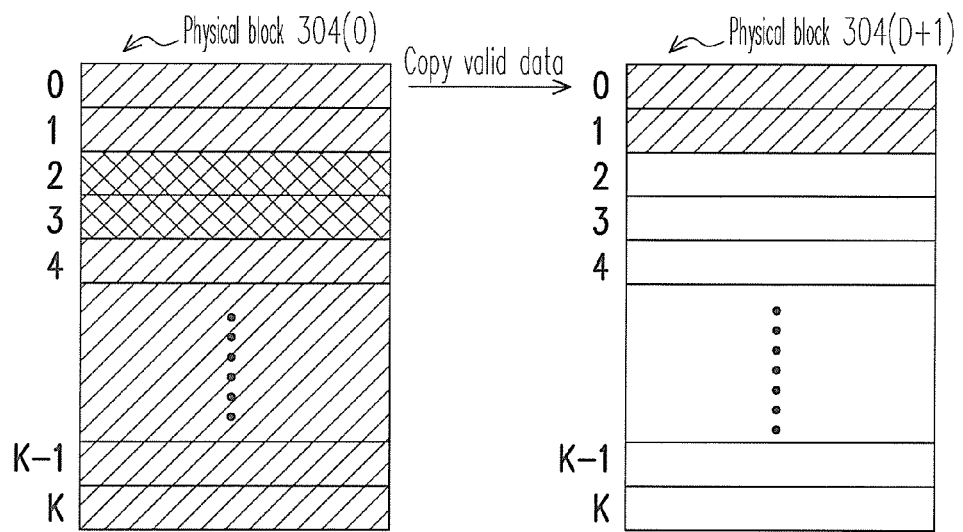
FIGS. 6~8 are diagrams illustrating an example of writing data into the memory module according to the exemplary embodiment of the present invention.
Figure 7:
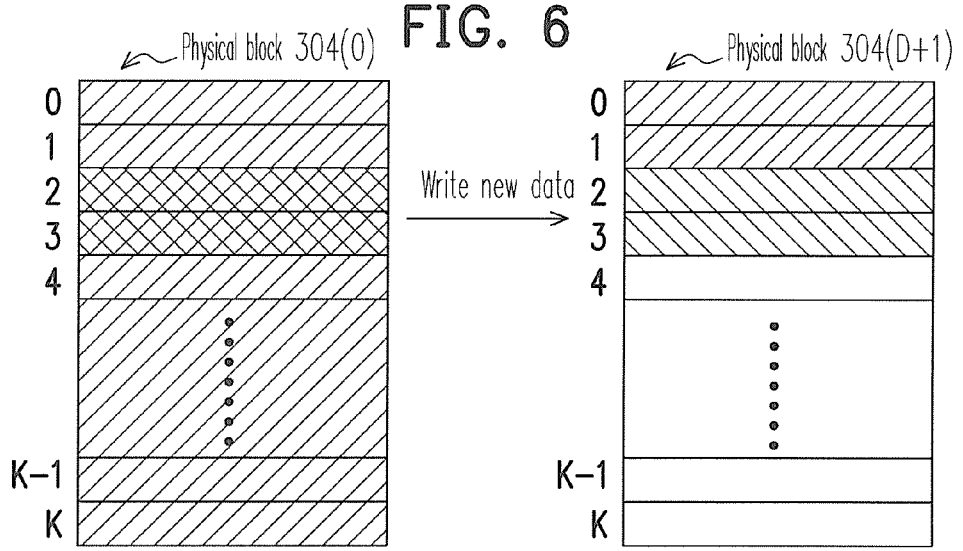
Figure 8:
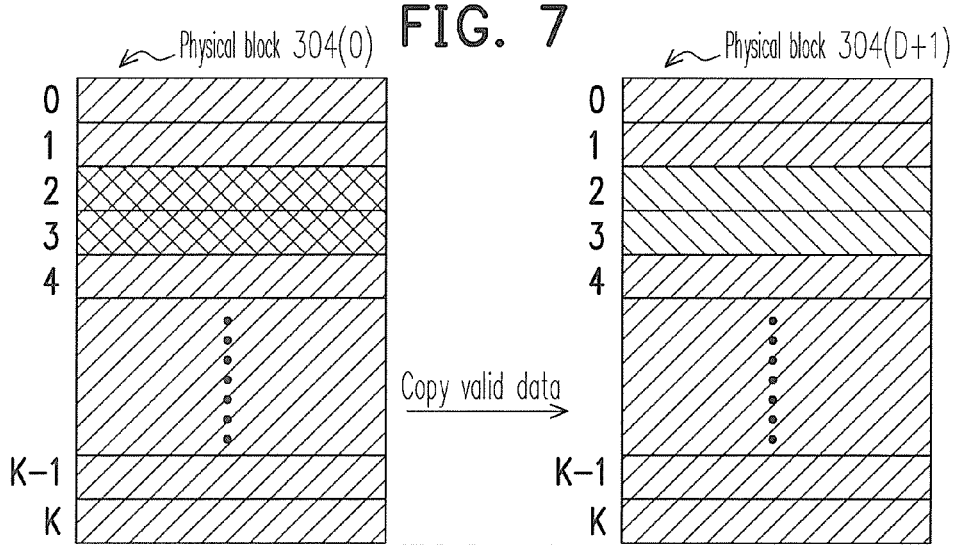

FIGS. 6~8 are diagrams illustrating an example of writing data into the memory module according to the exemplary embodiment of the present invention.

Referring to FIGS. 6~8, for example, when the logical block 510(0) currently maps to the physical block 304(0) and the memory controller 104 receives a write command from the host system 1000 for writing data into the logical addresses belonging to the logical block 510(0), the memory management circuit 202 identifies that the logical block 510(0) currently maps to the physical block 304(0) based on the logical block-physical block mapping table and gets the physical block 304(D+1) from the spare area 404 as a substitute physical block for substituting the physical block 304(0). However, the memory management circuit 202 does not instantly move all the valid data in the physical block 304(0) into the physical block 304(D+1) and erase the physical block 304(0) when executing the write command. To be specific, the memory management circuit 202 copies the valid data before the physical page for writing the new data in the physical block 304(0) (i.e., the $0^{th}$ physical page and the $1^{st}$ physical page of the physical block 304(0)) to the $0^{th}$ physical page and the $1^{st}$ physical page of the physical block 304 (D+1) (as shown in FIG. 6) and writes the new data into the $2^{nd}$ physical page and the $3^{rd}$ physical page of the physical block 304(D+1) (as shown in FIG. 7). At this time, the memory management circuit 202 completes the writing operation (i.e., the write command has been finished). Because the valid data in the physical block 304 (0) may become invalid during a next operation (for example, next write command), instantly moving all the valid data in the physical block 304(0) to the physical block 304(D+1) may become meaningless. Additionally, because data must be written orderly into the physical pages of the physical blocks, the memory management circuit 202 moves valid data before the physical page to be written first.

In the present exemplary embodiment, the operation of temporarily keeping this temporary relationship (i.e., a relationship between the physical block 304(0) and the physical block 304(D+1)) is referred to as opening mother-child blocks, and the original physical block is referred as a "mother physical block" and the substitute physical block is referred as a "child physical block".

Thereafter, the memory management circuit 202 will integrate the physical block 304(0) and the physical block 304 (D+1) into a single physical block when the contents of the two are to be actually combined, so that the efficiency of using physical blocks can be improved. Herein, the operation of integrating the physical blocks is also referred to as closing mother-child blocks. For example, as shown in FIG. 8, when closing the mother-child blocks, the memory management circuit 202 copies rest of the valid data in the physical block 304(0) (i.e., data stored in the $4^{th}$~$K^{th}$ physical pages of the physical block 304(0)) to the $4^{th}$~$K^{th}$ physical pages of the substitute physical block 304(D+1), and then erases the physical block 304(0) and associates the physical block 304 (0) with the spare area 404. Meanwhile, the physical block 304(D+1) is associated with the data area 402. Namely, the memory management circuit 202 re-maps the logical block 510(0) to the physical block 304 (D+1) in the logical block-physical block mapping table. Additionally, in the present exemplary embodiment, the memory management circuit 202 establishes a spare area physical block table (not shown) for recording the physical blocks currently associated with the spare area 404. It should be noted that when opening mother-child blocks, the memory management circuit 202 needs more storage spaces of the buffer memory 252 to store management variables for recoding detail storage statuses. For example, these management variables record which physical pages of the physical blocks 304(0) and 304 (D+1) are used to store valid data belonging to the logical block 510(0) (as shown in FIG. 7). Accordingly, during the operation of the portable memory storage apparatus 100, the number of mother-child blocks is limited. Therefore, when the portable memory storage apparatus 100 receives a write command from the host system 1000 and the number of opened mother-child blocks reaches the maximum, the memory management circuit 202 must close one of the opened mother-child blocks, so as to execute the currently received write command.

Figure 9:
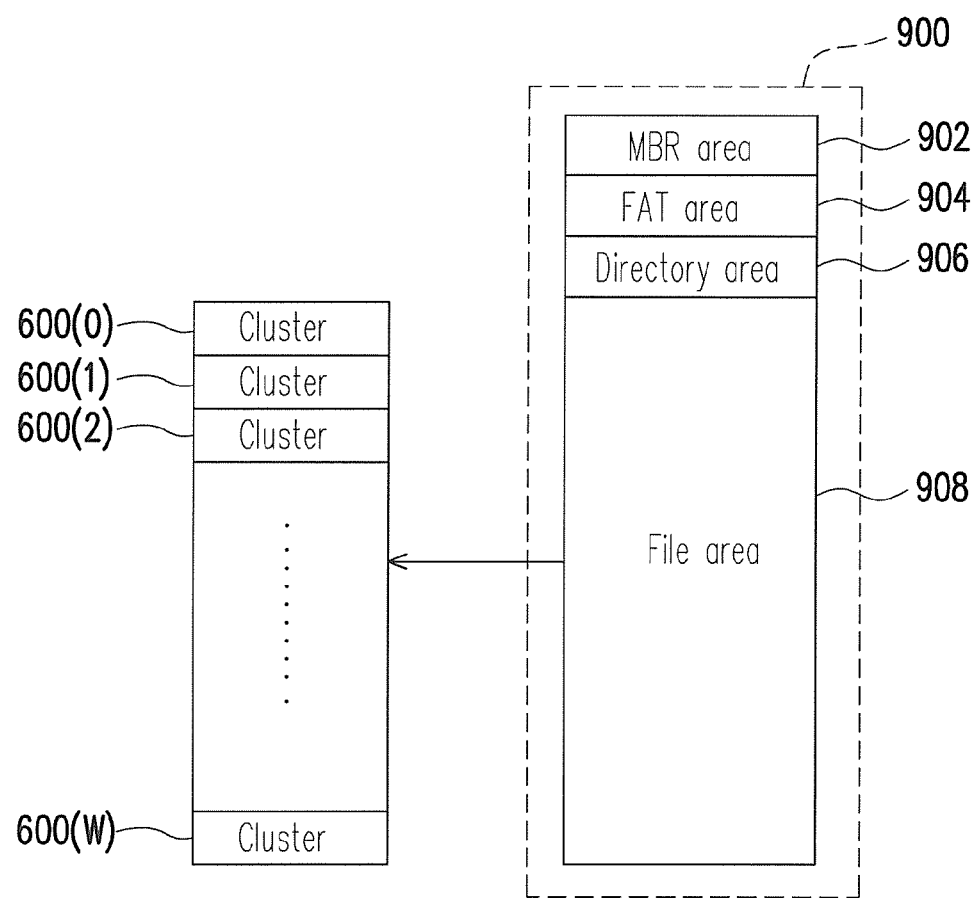
FIG. 9 illustrates an example of formatting the logical addresses of the memory module by a file system according to the exemplary embodiment of the present invention.

In the present exemplary embodiment, the operating system 1200 of the host system 1000 uses a file system to format the logical addresses of the logical blocks 510(0)~510(H) into one partition 900, as shown in FIG. 9. The partition 900 includes a master boot record (MBR) area 902, a file allocation table (FAT) area 904, a directory area 906 and a file area 908.

The logical addresses belonging to the MBR 902 are used for storing system information about the storage spaces of the portable memory storage apparatus 100.

The logical addresses belonging to the FAT area 904 are used for storing a FAT. The FAT records entry values corresponding to the logical addresses storing files. For example, two FATs are stored in the FAT area 904, wherein one of the FATs is used for normal access, and the other FAT is used as a backup FAT.

The logical addresses belonging to the directory area 906 are used for storing file description blocks (FDBs), wherein the FDBs record the attribute information of files and directories currently stored in the portable memory storage apparatus 100. In particular, the FDBs record start logical addresses for storing the files (i.e., start cluster).

The logical addresses belonging to the file area 908 are used for actually storing the content of files currently stored in the portable memory storage apparatus 100.

In the present exemplary embodiment, the size of each logical address corresponds to one sector. In the MBR area 904, the FAT area 906 and the directory area 906, data is accessed in unit of each sector.

To be specific, in a disk, the smallest storage unit is one sector and each sector can store 512 bytes of data. However, when storing data in unit of each sector, the performance of the host system 1000 would be not well. In general, the operating system 1200 of the host system 1000 would not take each sector as a unit of accessing data, but takes each cluster as a basic file unit. Each cluster is constructed with $2^n$ sectors. For example, if one cluster is constructed of 8 continuous sectors, then the size of the cluster is 4096 bytes. Accordingly, the operating system 1200 writes or reads data with 8 continuous sectors to enhance the efficiency of accessing data. However, the size of one cluster is not the larger the better. Because one cluster is the larger, the wasted storage spaces will be more. For example, when the size of one cluster is 4 kilobytes (KB) and the size of a file stored by the host system 1000 just is 1 KB, the file still occupies one cluster and other storage spaces of the cluster would be wasted. In particular, the total of clusters configured in the portable memory storage apparatus 100 is limited based on the capacity of the memory module 106 and the type of FAT. Taking FAT 16 as an example, the maximum number of clusters must be within 4048~65526 according the design of FAT16. Therefore, when a memory storage apparatus having 128 megabytes (MB) of storage spaces is formatted by FAT 16, each cluster must be constructed with at least 4 sectors, otherwise the number of clusters in the memory storage apparatus will exceed 65526 (i.e., 127901/512/4=62452). So, the size of each cluster is 2 KB. Similarly, according to the design of FAT 32, the maximum number of clusters must be within 65526~4177918. It should be noted that according to the design of FAT 16, the size of the directory area 906 is fixed. But, according to the design of FAT 32, the directory area 906 is configured in the file area 908 for managing together.

For example, in the present exemplary embodiment, the partition 900 is a partition complied with the standards of FAT 32. Therefore, the sectors belonging to the directory area 906 and the file area 908 are grouped into clusters 600(0)~600 (W). Herein, it is assumed that the cluster 600(0) is configured as a start cluster of the directory area 906.

Figure 10A:
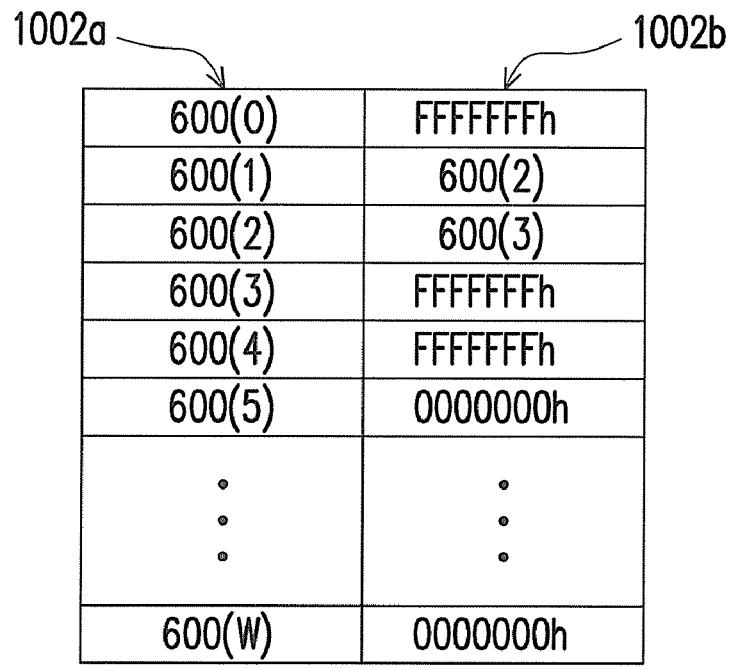
FIG. 10A and FIG. 10B illustrate an example of a file allocation table and a file description block according to the exemplary embodiment of the present invention.
Figure 10B:
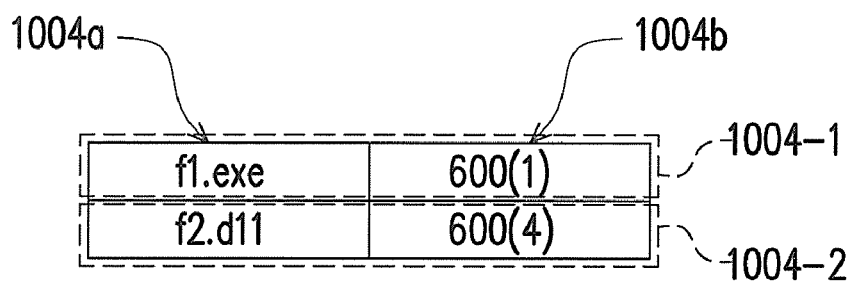

FIG. 10A and FIG. 10B illustrate an example of the file allocation table and the file description block according to the exemplary embodiment of the present invention.

Referring to FIG. 10A, in the present example, an entry value corresponding to each of the clusters is sequentially recorded in a cluster index field 1002a and an entry value field 1002b of a FAT 1002, wherein each entry value in the FAT 1002 represents the status of corresponding cluster by using special symbols. For example, according the design of FAT32, "0000000h" represents that the cluster is an idle logical address (i.e., stores no data); "FFFFFF7h" represents that the cluster is a bad logical address (i.e., a bad cluster that can not be used to store data); and "FFFFFF8h"-"FFFFFFFh" represents that the cluster is the last logical address for storing a file.

Referring to FIG. 10B, the file name field 1004a and the start address field 1004b of a file description block 1004 are used for recording the name of a file stored in the portable memory storage apparatus 100 and the start logical address for storing the file. Each file is corresponding to one file description block. It should be understood that the file description block 1004 shown in FIG. 10B is only an example and which may further include a file length field or other attribute fields for describing the information of the stored file.

Referring to both FIG. 10A and FIG. 10B, it can be understood based on the space information in the file description block 1004-1 and 1004-2 that the portable memory storage apparatus 100 stores two files (i.e., "f1.exe" and "f2.dll"), wherein the start logical address for storing "f1.exe" is the cluster 600(1), and the start logical address for storing "f2.dll" is the cluster 600(4). In addition, it can be understood that the content of "f1.exe" is sequentially stored in the clusters 600(1), 600(2), and 600(3) and the content of "f2.dll" is stored in the cluster 600(4) according to the entry values recorded in the FAT 1002.

Moreover, it should be noted that according to the design of FAT 32, the directory area 906 is managed with the file area 908. Therefore, the clusters belonging to the directory area 906 may be expanded dynamically for recoding more file description blocks, such that the number of files that can be stored in the portable memory storage apparatus 100 is not limited. To be specific, an entry value corresponding to the start cluster of the directory area 906 is recorded in the FAT 1002. For example, as shown in FIG. 10A, when the portable memory storage apparatus 100 is formatted, the cluster 600(0) is the start cluster of the directory area 906 and the entry value of the cluster 600(0) is "FFFFFFFh". That is to say, the cluster 600(0) is used for storing the file description blocks 1004-1 and 1004-2. After that, when the storage spaces of the cluster 600(0) is filled with data, the operating system 1200 selects an empty cluster from the file area 908 based on the FAT 1002 for storing newly added file description block and the entry value of the cluster 600(0) is updated into the selected cluster in the FAT 1002.

Figure 10C:
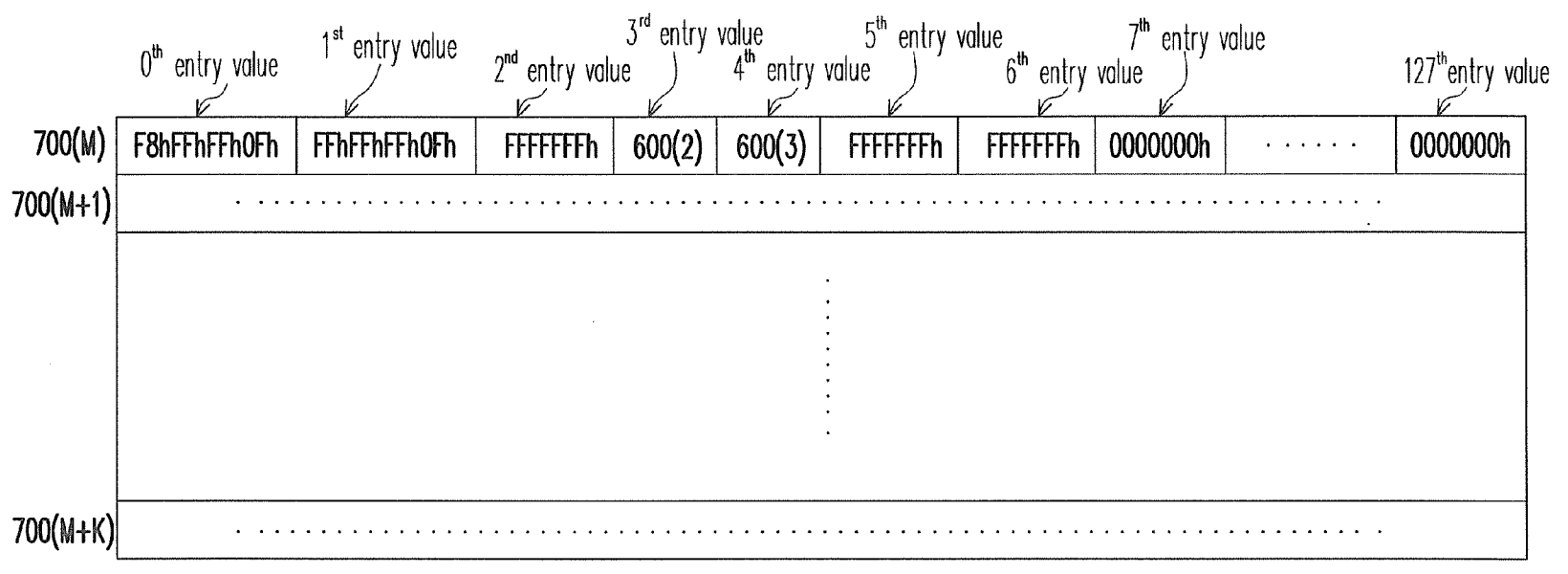

FIG. 10C illustrates an example of the file allocation table area according to the exemplary embodiment of the present invention.

Referring to FIG. 10A and FIG. 10C, the FAT area 904 includes sectors 700(M)~700(M+K). First two entry values of the sector 700(M) (i.e., first eight bytes) are reserved and recorded with "F8hFFhFFh0Fh" and "FFhFFhFFh0Fh". The $2^{nd}$ entry value corresponding to the cluster 600(0) of the directory area 906 is "FFFFFFFh". The $3^{rd}$ entry value corresponding to the cluster 600(1) is "600(2)". The $4^{th}$ entry value corresponding to the cluster 600(2) is "600(3)". The $5^{th}$ entry value corresponding to the cluster 600(3) is "FFFFFFFh". The $6^{th}$ entry value corresponding to the cluster 600(4) is "FFFFFFFh". The $7^{th}$ entry value corresponding to the cluster 600(5) is "0000000h". By the same token, the entry values corresponding to the clusters 600(0)~600(W) are recorded in the sectors of the FAT area 904.

In the present exemplary embodiment, the memory controller 104 changes the FAT 1002 according to the state of the mode selecting switch 108. To be specific, when the mode selecting switch 108 is at the data protecting mode, the memory management circuit 202 performs a file hiding procedure to change the FAT 1002.

Figure 11:
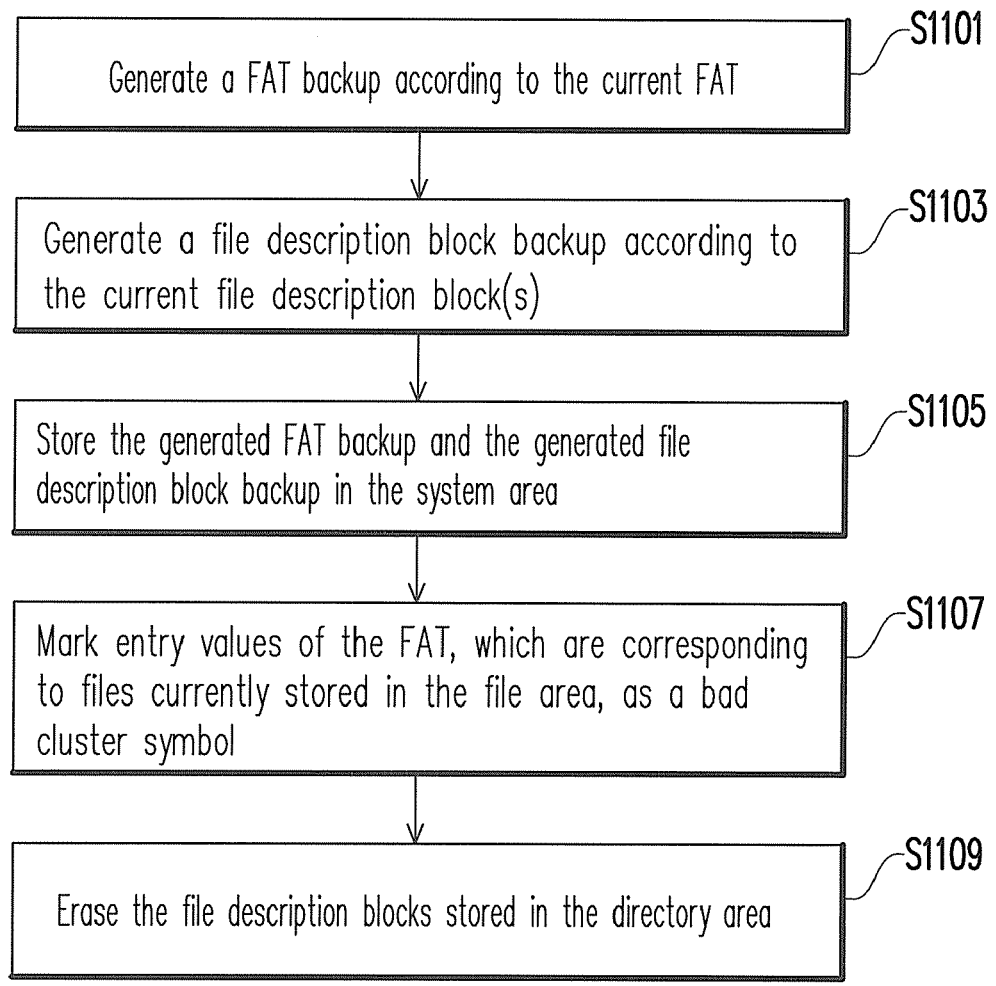
FIG. 11 is a flowchart illustrating a file hiding procedure according to the exemplary embodiment of the present invention.

FIG. 11 is a flowchart illustrating the file hiding procedure according to the exemplary embodiment of the present invention.

Referring to FIG. 11, in step S1101, the memory management circuit 202 of the memory controller 104 generates a FAT backup according to the current FAT 1002, and in step S1103, the memory management circuit 202 generates a file description block backup according to the current file description block(s).

For example, the memory management circuit 202 completely copies the current FAT 1002 to generate a FAT backup and copies file description blocks corresponding to files currently stored in the file area 908 to generate a file description block backup. It should be noted that in another exemplary embodiment, the memory management circuit 202 may also copy entry values of the FAT 1002, which are corresponding to files currently stored in the file area 908.

In step S1105, the memory management circuit 202 stores the generated FAT backup and the generated file description block backup in the system area 406.

However, in step S1107, the memory management circuit 202 marks entry values of the FAT 1002, which are corresponding to files currently stored in the file area 908, as a bad cluster symbol, and in step S1109, the memory management circuit 202 erases the file description blocks stored in the directory area 906.

Accordingly, when the operating system 1200 accesses the memory module 106 based on the current FAT 1002 after this file hiding procedure is performed, the operating system 1200 will not obtain information about the files originally stored in the file area 908. Therefore, the files will not be accessed by the operating system 1200.

Figure 12:
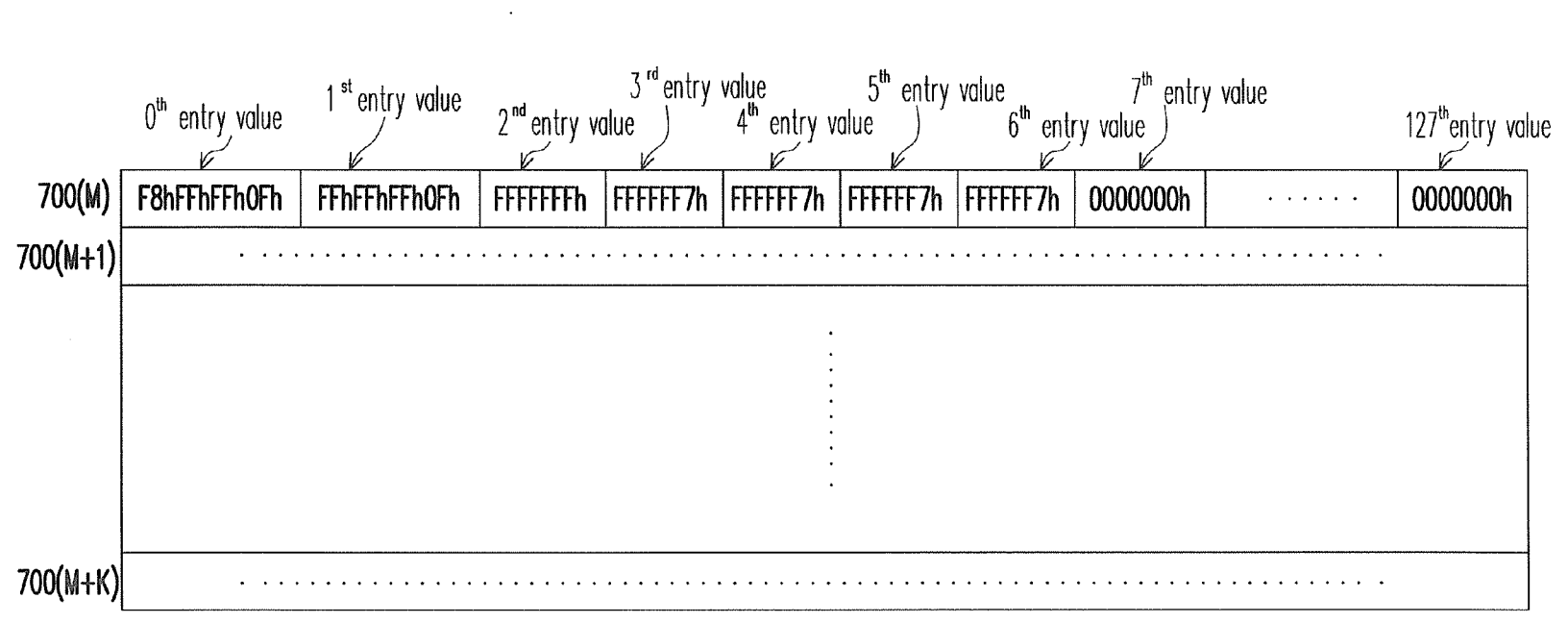

FIG. 12 is another diagram of the file allocation table area according to the exemplary embodiment of the present invention, wherein an example, that the file hiding procedure is performed at a status shown in FIG. 10A, FIG. 10B and FIG. 10C, is shown.

Referring to FIG. 10A, FIG. 10B and FIG. 10C, "f1.exe" and "f2.dll" (together referred to as a first file hereafter) are stored currently in the file area 908, file description blocks 1004-1 and 1004-2 (together referred to as a first file description block hereafter) are stored in the directory area 906 and the $3^{rd}$~$6^{th}$ entry values (together referred to as a first entry value) of the FAT 1002 record entry values corresponding to the logical addresses storing the first file.

Referring to FIG. 12, during the file hiding procedure, the memory management circuit 202 marks the $1^{st}$ entry value of the FAT 1002 as the bad cluster symbol after copying the FAT 1002 shown in FIG. 10C to generate the FAT backup. For example, taking FAT 32 as an example, the $1^{st}$ entry value of the FAT 1002 is marked as "FFFFFF7h". Additionally, during the above-mentioned file hiding procedure, the first file description block in the partition 900 is erased.

Accordingly, after the above-mentioned file hiding procedure is performed, the operating system 1200 of the host system 1000 will not identify the first file stored in the file area 908 based on the changed FAT 1002 and information recorded in the directory area 906. Additionally, the $1^{st}$ entry value of the FAT 1002 is marked as the bad cluster symbol, so the logical addresses storing the first file in the file area 908 will not be used for storing other data by the operating system 1200. That is, if the total volume of the portable memory storage apparatus 100 is 1 gigabyte (GB) and the size of the first file is 100 megabytes (MB), the operating system 1200 identifies that the available volume of the portable memory storage apparatus 100 is 900 MB.

That is, the operating system 1200 may store new file into the partition 900 under the status shown in FIG. 12.

Figures 13A, 13B:
FIG. 13A and FIG. 13B illustrate another example of the file allocation table and the file description block according to the exemplary embodiment of the present invention.

FIG. 13A and FIG. 13B illustrate another example of the file allocation table and the file description block according to the exemplary embodiment of the present invention.

Referring to FIG. 13A and FIG. 13B, when the operating system 1200 is about to store a second file (e.g., "f3.exe"), which will occupy two clusters, into the partition 900 at the status shown in FIG. 12, the operating system 1200 adds a file description block 1004-3 (also referred to as a second file description block) corresponding to the second file in the directory area 906 and changes respectively the $7^{th}$ entry value and the $8^{th}$ entry value of the FAT 1002 as "600(6)" and "FFFFFFFh" for recording that the clusters 600(5) and 600(6) are used for storing the second file.

Besides the above-mentioned file hiding procedure, in the present exemplary embodiment, when the mode selecting switch 108 is at the non-data protecting mode, the memory management circuit 202 determines whether the FAT backup and the file description block backup are stored in the system area 406. And, if the FAT backup and the file description block backup are stored in the system area 406, the memory management circuit 202 performs a file showing procedure to change the FAT 1002, such that the operating system 1200 can access all of the logical addresses in the partition 900.

Figure 14:
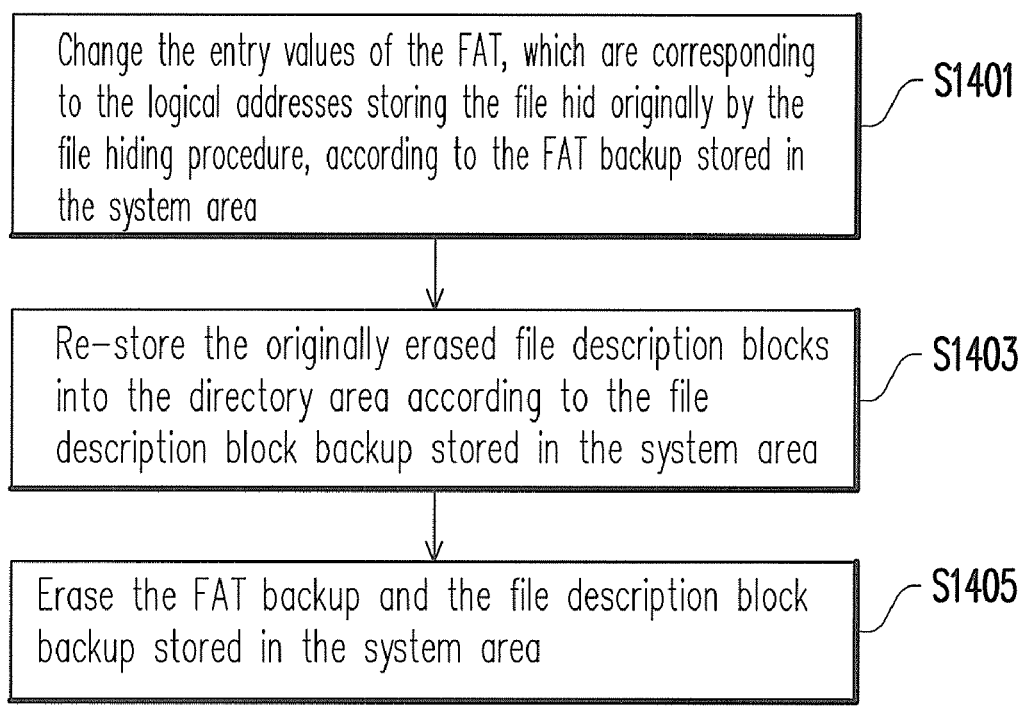
FIG. 14 is a flowchart illustrating a file showing procedure according to the exemplary embodiment of the present invention.

FIG. 14 is a flowchart illustrating a file showing procedure according to the exemplary embodiment of the present invention.

Referring to FIG. 14, in step S1401, the memory management circuit 202 of the memory controller 104 changes the entry values of the FAT 1002, which are corresponding to the logical addresses storing the file hid originally by the file hiding procedure, according to the FAT backup stored in the system area 406. And, in step S1403, the memory management circuit 202 re-stores the originally erased file description blocks into the directory area 906 according to the file description block backup stored in the system area 406.

After that, in step S1405, the memory management circuit 202 erases the FAT backup and the file description block backup stored in the system area 406.

Figures 15A, 15B:
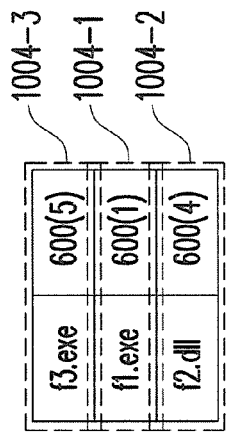
FIG. 15A and FIG. 15B illustrate another example of the file allocation table and the file description block according to the exemplary embodiment of the present invention.

FIG. 15A and FIG. 15B illustrate another example of the file allocation table and the file description block according to the exemplary embodiment of the present invention, wherein an example, that the file showing procedure is performed at a status shown in FIG. 13A and FIG. 13B, is shown.

Referring to FIG. 15A and FIG. 15B, the first file description block (i.e., the file description blocks 1004-1 and 1004-2) is re-stored into the directory area 906. For example, the first file description block is stored into the directory area 906 following the second file description block. Additionally, the $3^{th}$~$6^{th}$ entry values of the FAT 1002 are restored as "600(2)", "600(3)", "FFFFFFFh" and "FFFFFFFh". At this time, the operating system 1200 of the host system 1000 is capable of accessing the first and second files (i.e., "f1.exe", "f2.dll" and "f3.exe") based on the current FAT 1002 and the current file description blocks.

Figure 16:
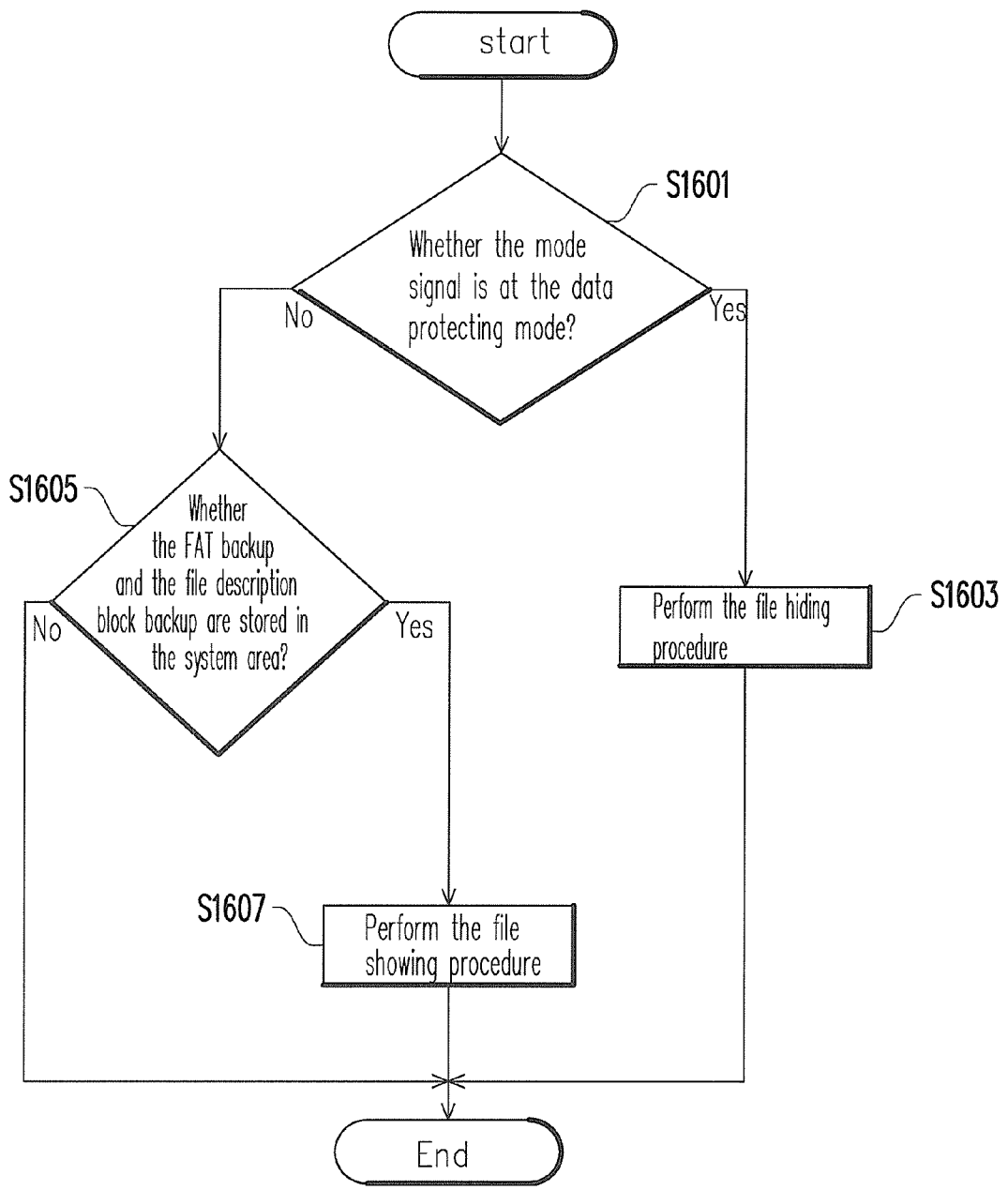
FIG. 16 is a flowchart illustrating the data protecting method according to the exemplary embodiment of the present invention.

FIG. 16 is a flowchart illustrating the data protecting method according to the exemplary embodiment of the present invention.

Referring to FIG. 16, when the portable memory storage apparatus 100 is coupled to the host system 1000, in step S1601, the memory management circuit 202 determines whether the mode signal is at the data protecting mode. For example, as descried above, the mode signal is generated by the mode selecting switch 108. Nevertheless, it should be understood that the present invention is not limited thereto.

If the mode signal is at the data protecting mode, in step S1603, the memory management circuit 202 performs the above-mentioned file hiding procedure. Then, the process shown in the FIG. 16 is terminated after step S1603. For example, after the process shown in the FIG. 16 is terminated, the memory management circuit 202 starts to process write commands, read commands or erase commands from the host system 1000.

If the mode signal is not at the data protecting mode, in step S1605, the memory management circuit 202 determines whether the FAT backup and the file description block backup are stored in the system area 406.

If the FAT backup and the file description block backup are not stored in the system area 406, the process shown in the FIG. 16 is terminated. On the contrary, if the FAT backup and the file description block backup are stored in the system area 406, in step S1607, the memory management circuit 202 performs the above-mentioned file showing procedure. Then, the process shown in the FIG. 16 is terminated.

In summary, the data protecting method, the memory controller and the portable memory storage apparatus according to the exemplary embodiment can hide or show files stored in the memory module based on the mode signal. Additionally, a user can operate conveniently the mode selecting switch to select the data protecting mode or the non-data protecting mode. Accordingly, when a user lends others his/her flash drive, it is prevented from accessing personal files by others by the mode selecting switch. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data protecting method, for a non-volatile memory module, wherein the non-volatile memory module has a plurality of physical blocks, the data protecting method comprising:

grouping the physical blocks into at least a data area, a spare area, and a system area;

configuring a plurality of logical addresses; and grouping the logical addresses into a plurality of logical blocks for mapping to the physical blocks of the data area, wherein the logical addresses are formatted as one partition, the partition includes a file allocation table (FAT) area, a file area and a directory area, the FAT area stores a FAT, the file area stores a first file, the directory area stores a first file description block corresponding to the first file and the FAT records at least one first entry value corresponding to logical addresses storing the first file;

determining whether a mode signal is at a data protecting mode; and performing a file hiding procedure when the mode signal is at the data protecting mode, wherein the file hiding procedure comprises:

generating a FAT backup according to the FAT;

storing the FAT backup in the system area;

generating a file description block backup according to the first file description block;

storing the file description block backup in the system area;
marking the at least one first entry value corresponding to the logical addresses storing the first file in the FAT as a bad cluster symbol indicating that data can not be stored; and
erasing the first file description block in the partition.

2. The data protecting method according to claim 1, wherein the step of generating the FAT backup according to the FAT comprises:
copying the at least one first entry value corresponding to the logical addresses storing the first file in the FAT to generate the FAT backup.

3. The data protecting method according to claim 1, wherein the step of generating the FAT backup according to the FAT comprises:
completely copying the FAT to generate the FAT backup.

4. The data protecting method according to claim 1, further comprising:
determining whether the FAT backup and the file description block backup is stored in the system area when the mode signal is not at the data protecting mode; and
performing a file showing procedure when the FAT backup and the file description block backup is stored in the system area, wherein the file showing procedure comprises:
changing the at least one first entry value corresponding to the logical addresses storing the first file in the FAT according to the FAT backup;
re-storing the first file description block into the directory area according to the file description block backup stored in the system area; and
erasing the FAT backup and the file description block backup stored in the system area.

5. The data protecting method according to claim 4, further comprising:
writing a second file into the physical blocks of the data area according to a write command from a host system after performing the file hiding procedure and before performing the file showing procedure,
wherein the second file is stored in the file area, a second file description block corresponding to the second file is stored in the directory area and the FAT records at least one second entry value corresponding to logical addresses storing the second file.

6. The data protecting method according to claim 5, wherein the step of re-storing the first file description block into the directory area according to the file description block backup stored in the system area comprises:
storing the first file description block into the directory area following the second file description block according to the file description block backup stored in the system area.

7. The data protecting method according to claim 1, further comprising:
configuring a mode selecting switch, wherein the mode signal is generated by the mode selecting switch.

8. A memory controller, for managing a non-volatile memory module, wherein the non-volatile memory module has a plurality of physical blocks, the memory controller comprising:
a host interface, configured to couple to a host system;
a memory interface, configured to couple to the non-volatile memory module; and
a memory management circuit, coupled to the host interface and the memory interface, wherein the memory management circuit is configured to:
group the physical blocks into at least a data area, a spare area, and a system area;
configure a plurality of logical addresses; and group the logical addresses into a plurality of logical blocks for mapping to the physical blocks of the data area, wherein the logical addresses are formatted as one partition, the partition includes a file allocation table (FAT) area, a file area and a directory area, the FAT area stores a FAT, the file area stores a first file, the directory area stores a first file description block corresponding to the first file and the FAT records at least one first entry value corresponding to logical addresses storing the first file;
determine whether a mode signal is at a data protecting mode; and
perform a file hiding procedure when the mode signal is at the data protecting mode, wherein the file hiding procedure comprises:
generating a FAT backup according to the FAT;
storing the FAT backup in the system area;
generating a file description block backup according to the first file description block;
storing the file description block backup in the system area;
marking the at least one first entry value corresponding to the logical addresses storing the first file in the FAT as a bad cluster symbol indicating that data can not be stored; and
erasing the first file description block in the partition.

9. The memory controller according to claim 8, wherein the procedure of generating the FAT backup according to the FAT by the memory management circuit comprises:
copying the at least one first entry value corresponding to the logical addresses storing the first file in the FAT to generate the FAT backup.

10. The memory controller according to claim 8, wherein the procedure of generating the FAT backup according to the FAT by the memory management circuit comprises:
completely copying the FAT to generate the FAT backup.

11. The memory controller according to claim 8,
the memory management circuit is further configured to determine whether the FAT backup and the file description block backup is stored in the system area when the mode signal is not at the data protecting mode, and
wherein the memory management circuit is further configured to perform a file showing procedure when the FAT backup and the file description block backup is stored in the system area, wherein the file showing procedure comprises:
changing the at least one first entry value corresponding to the logical addresses storing the first file in the FAT according to the FAT backup;
re-storing the first file description block into the directory area according to the file description block backup stored in the system area; and
erasing the FAT backup and the file description block backup stored in the system area.

12. The memory controller according to claim 11, wherein the memory management circuit is further configured to write a second file into the physical blocks of the data area according to a write command from the host system after the file hiding procedure is performed and before the file showing procedure is performed,
wherein the second file is stored in the file area, a second file description block corresponding to the second file is stored in the directory area and the FAT records at least one second entry value corresponding to logical addresses storing the second file.

13. The memory controller according to claim 12, wherein the procedure of re-storing the first file description block into the directory area according to the file description block backup stored in the system area by the memory management circuit comprises:
storing the first file description block into the directory area following the second file description block according to the file description block backup stored in the system area.

14. A portable memory storage apparatus, comprising:
a mode selecting switch;
a connector, configured to couple to a host system;
a non-volatile memory module, having a plurality of physical blocks; and
a memory controller, coupled to the mode selecting switch, the non-volatile memory module and the connector and configured to:
group the physical blocks into at least a data area, a spare area, and a system area;
configure a plurality of logical addresses; and group the logical addresses into a plurality of logical blocks for mapping to the physical blocks of the data area, wherein the logical addresses are formatted as one partition, the partition includes a file allocation table (FAT) area, a file area and a directory area, the FAT area stores a FAT, the file area stores a first file, the directory area stores a first file description block corresponding to the first file and the FAT records at least one first entry value corresponding to logical addresses storing the first file;
determine whether a mode signal of the mode selecting switch is at a data protecting mode; and
perform a file hiding procedure when the mode signal of the mode selecting switch is at the data protecting mode, wherein the file hiding procedure comprises:
generating a FAT backup according to the FAT;
storing the FAT backup in the system area;
generating a file description block backup according to the first file description block;
storing the file description block backup in the system area;
marking the at least one first entry value corresponding to the logical addresses storing the first file in the FAT as a bad cluster symbol indicating that data can not be stored; and
erasing the first file description block in the partition.

15. The portable memory storage apparatus according to claim 14, wherein the procedure of generating the FAT backup according to the FAT by the memory controller comprises:
copying the at least one first entry value corresponding to the logical addresses storing the first file in the FAT to generate the FAT backup.

16. The portable memory storage apparatus according to claim 14, wherein the procedure of generating the FAT backup according to the FAT by the memory controller comprises:
completely copying the FAT to generate the FAT backup.

17. The portable memory storage apparatus according to claim 14,
wherein the memory controller is further configured to determine whether the FAT backup and the file description block backup is stored in the system area when the mode signal of the mode selecting switch is not at the data protecting mode, and wherein the memory controller is further configured to perform a file showing procedure when the FAT backup and the file description block backup is stored in the system area, wherein the file showing procedure comprises:
changing the at least one first entry value corresponding to the logical addresses storing the first file in the FAT according to the FAT backup;
re-storing the first file description block into the directory area according to the file description block backup stored in the system area; and
erasing the FAT backup and the file description block backup stored in the system area.

18. The portable memory storage apparatus according to claim 17, wherein the memory controller is further configured to write a second file into the physical blocks of the data area according to a write command from the host system after the file hiding procedure is performed and before the file showing procedure is performed,
wherein the second file is stored in the file area, a second file description block corresponding to the second file is stored in the directory area and the FAT records at least one second entry value corresponding to logical addresses storing the second file.

19. The portable memory storage apparatus according to claim 18, wherein the procedure of re-storing the first file description block into the directory area according to the file description block backup stored in the system area by the memory controller comprises:
storing the first file description block into the directory area following the second file description block according to the file description block backup stored in the system area.

20. The portable memory storage apparatus according to claim 14, wherein the mode selecting switch is a push-button switch, a dual in-line package (DIP) switch, a magnetic induction switch, a fingerprint switch or a radio frequency identification (RFID) switch.

21. A data protecting method, for a portable memory storage apparatus, wherein the portable memory storage apparatus includes a non-volatile memory module having a plurality of physical blocks, the data protecting method comprising:
grouping the physical blocks into at least a data area, a spare area, and a system area;
configuring a plurality of logical addresses; and grouping the logical addresses into a plurality of logical blocks for mapping to the physical blocks of the data area, wherein the logical addresses are formatted as one partition, the partition includes a file allocation table (FAT) area, a file area and a directory area, the FAT area stores a FAT, the file area stores a first file, the directory area stores a first file description block corresponding to the first file and the FAT records at least one first entry value corresponding to logical addresses storing the first file;
determining whether a mode signal is at a data protecting mode;
performing a file hiding procedure to change the FAT if the mode signal is at the data protecting mode, wherein a host system coupled to the portable memory storage apparatus is allowed to access only a portion of the logical addresses based on the changed FAT corresponding to the file hiding procedure and the first file is stored in another portion of the logical addresses; and
performing a file showing procedure to change the FAT if the mode signal is not at the data protecting mode, wherein the host system is allowed to access all of the logical addresses based on the changed FAT corresponding to the file showing procedure.

22. The data protecting method according to claim 21, wherein the file hiding procedure comprises:
    generating a FAT backup according to the FAT;
    storing the FAT backup in the system area;
    generating a file description block backup according to the first file description block;
    storing the file description block backup in the system area;
    marking the at least one first entry value corresponding to the logical addresses storing the first file and the first file description block in the FAT as a bad cluster symbol indicating that data can not be stored; and
    erasing the first file description block in the partition.

23. The data protecting method according to claim 22, wherein the file showing procedure comprises:
    changing the at least one first entry value corresponding to the logical addresses storing the first file in the FAT according to the FAT backup;
    re-storing the first file description block into the directory area according to the file description block backup stored in the system area; and
    erasing the FAT backup and the file description block backup stored in the system area.

24. The data protecting method according to claim 21, further comprising:
    configuring a mode selecting switch, wherein the mode signal is generated by the mode selecting switch.

* * * * *